F. W. STEVENS.

CASEMENT WINDOW HARDWARE.

APPLICATION FILED APR. 23, 1920.

Reissued Nov. 23, 1920.

14,993.

INVENTOR.

Frank W. Stevens by Machad, Calver, Copeland & Daly.

Attys.

UNITED STATES PATENT OFFICE.

FRANK W. STEVENS, OF NEWTON, MASSACHUSETTS.

CASEMENT-WINDOW HARDWARE.

14,993. Specification of Reissued Letters Patent. Reissued Nov. 23, 1920.

Original No. 1,334,412, dated March 23, 1920, Serial No. 280,857, filed March 5, 1919. Application for reissue filed April 23, 1920. Serial No. 376,154.

*To all whom it may concern:*

Be it known that I, FRANK W. STEVENS, a citizen of the United States, residing at Newton, county of Middlesex, State of Massachusetts, have invented a certain new and useful Improvement in Casement-Window Hardware, of which the following is a specification, reference being had therein to the accompanying drawings.

My invention relates to fittings for casement windows of the type which are hinged vertically to swing outward and also may be moved from one side to the other of the window frame on tracks or ways located on the window stool and lintel respectively. I am aware that fittings of this type have heretofore been made, but such fittings have not been satisfactory, chiefly for two reasons. First, because the windows have frequently become detached from the grooves or ways and have fallen to the ground injuring the window or passers-by, and second it has been impossible to keep such windows air and rain tight when closed. The devices embodying my invention obviate both of these difficulties and are simple and inexpensive to construct.

The invention will be fully understood from the following description when taken in connection with the accompanying drawings, and the novel features thereof will be pointed out and clearly defined in the claims at the close of this specification.

In the drawings, Figure 1 is a view in elevation of a casement window to which is applied a set of fittings embodying my invention.

Figure 1:
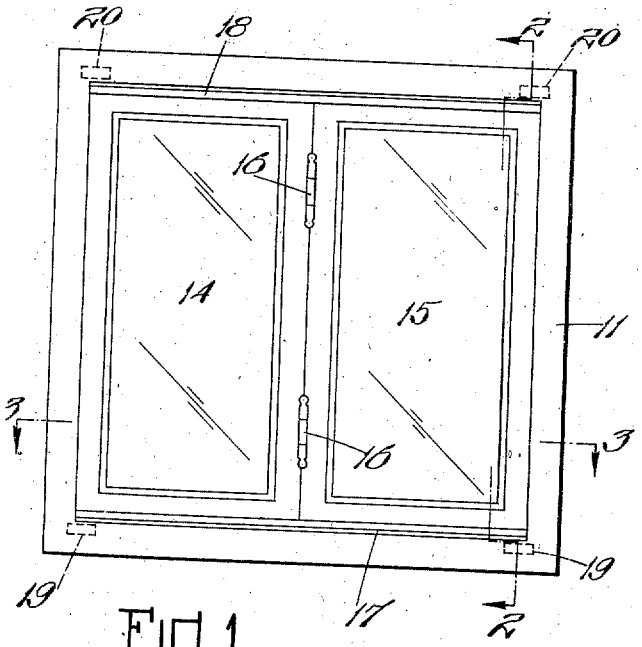
Figure 2:
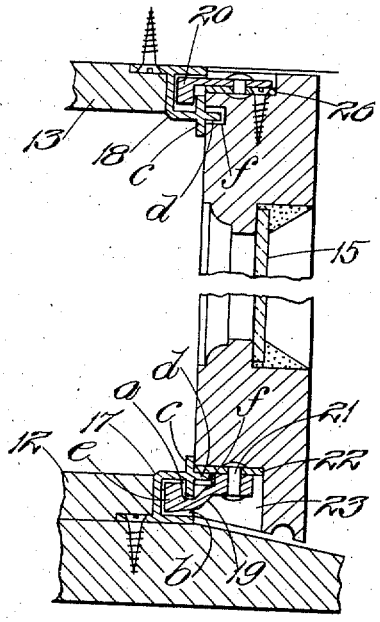
Fig. 2 is a section on line 2—2 of Fig. 1.
Figure 3:
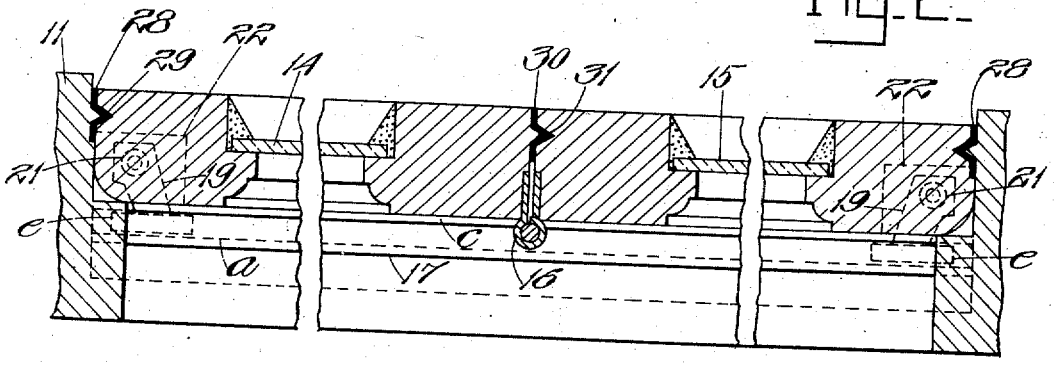
Fig. 3 is a section on line 3—3 of Fig. 1.
Figure 4:
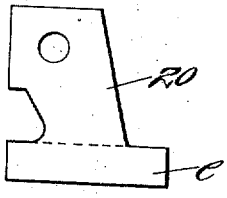
Fig. 4 is a plan view on an enlarged scale of the top hanger.
Figure 5:
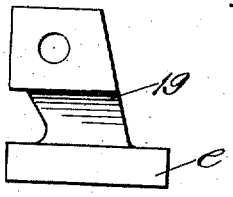
Fig. 5 is a view on an enlarged scale of the bottom hanger.

Referring to the drawings, at 11 is shown the window frame. At 12 is shown the window stool and at 13 is shown the window lintel. In the drawings, I have shown two casement window sashes 14 and 15 hinged together at 16. On the front edge of both the stool and the lintel are secured tracks or ways 17 and 18 respectively. These ways are identical and are constructed from suitable metal, as for instance, brass. Each way has an interior channel *a* having an opening *b* all along its front face. The opening *b* is narrower than the total height of the channel *a*. The ends of the channels are closed by the sides of the window frame. The ways 17 and 18 are each provided with a horizontal rib *d* and with a vertical rib *e*. Each sash is provided on top and bottom with lugs 20 and 19, respectively. The lug 19 is attached by a rivet 21 to a metal plate 22 in a space 23 cut into the corner of the sash. The sash swings on the lug as the window opens. The bottom lug 19 has an enlarged end *c* which fits into the channel *a* and cannot be withdrawn through the opening *b* but can slide along it. The shape of the lug will be clearly seen in Fig. 5. The lug is inserted through the open end of the way before the way is put in place and carries the load imposed by the down thrust of the sash. There is also an inward thrust which is taken by the lug when the window is open. Another function of the lug 19 is to form a pivotal support on which the sash may swing. In the face of the sash which is adjacent the way 17, there is a groove *f* which coöperates with the rib *d* to make this part of the sash air and rain tight. On the top of the sash there is a plate 26, and to this is pivotally attached the lug 20. This lug also has an enlarged end which is received within the channel in the way 18. The function of this lug is to prevent the upper end of the sash swinging outward and also to afford a pivotal support for the sash. No load is carried by the upper way 18 except what is imposed by the tendency of the sash to fall outward. The two ribs *d*, *d* coöperate with grooves *f*, *f* in the inner face at the top and bottom of the window sash, and these form wind and water joints at these points.

I provide each side of the frame of the window with a vertical V-shaped rib of metal 28 which coöperates with the groove 29 in the proximate face of the sash. A similar rib 30 and groove 31 are formed on the edges of the sash which are hinged together when a double sash is employed. This renders the joints at these points completely water and wind tight.

It will be seen that the herein described fixtures are such that either of the lugs 19 or 20 can possibly be disengaged from its appropriate way and therefore there is no possibility that the sash can get unfastened and fall. The sash can be readily moved from one part of the window to another since it rests chiefly on the lug and not on the rib.

What I claim is:—

1. In combination with a sash for a casement window the parts of which are hinged together vertically, a way secured to the window stool having therein a channel and a slot affording access to the channel, said way having two ribs one of which extends vertically and the other extends horizontally and serving to receive the in-thrust and down-thrust of the bottom of the sash respectively, a lug pivotally secured to the bottom of the sash and having an enlarged end member received within and slidable lengthwise of said channel, a second way secured to the window lintel and having therein a channel and a slot affording access to the channel, and a lug pivotally secured to the top of the sash and having an enlarged end in the said channel.

2. In combination with a sash for a casement window and having grooves formed in the face which is next to the window frame, a way secured to the window stool, a second way secured to the window lintel, each of said ways having a channel formed therein and a slot affording access to the channel and being provided with a protruding horizontal rib, lugs secured to the top and bottom of the sash and having enlarged end members adapted to be received and to slide within the channels while being retained therein, said lugs extending outwardly through said slots, the ribs on the ways being adapted to coöperate with the grooves in the sash and form a tight joint when the window is closed.

3. In a casement window, in combination with a window frame, a grooved way secured to a horizontal member of the said window frame, said way being provided with a vertical and a horizontal rib, a lug having an enlarged end slidable in said grooved way, and a sash to which said lug is secured, said sash being provided with a groove on the back face adapted upon closing the sash to receive the horizontal rib with the inside face of the sash against the vertical rib in weather-tight relationship.

4. In a casement window, in combination with a window frame, a grooved way secured to a horizontal member of the said window frame, said way being provided with a vertical and a horizontal rib, lugs having each an enlarged end slidable in said grooved way, and a pair of sash supported by said lugs vertically hinged together and each sash provided with a groove on the inside face adapted upon closing the sash to receive the horizontal rib with the inside face of the sash against the vertical rib in weather-tight relationship.

5. In a casement window, in combination with a frame, a grooved way on the stool and another on the lintel of said frame, said ways being each provided with a vertical and a horizontal rib, lugs having each an enlarged end slidable in the grooves in said ways, and a pair of sash supported by said lugs vertically hinged together and provided with grooves on the back face adapted upon closing the sash to receive the respective horizontal ribs with the inside face of the sash against the said vertical ribs in weather-tight relationship.

In testimony whereof I affix my signature.

FRANK W. STEVENS.